US012603564B2

(12) United States Patent
Yee et al.

(10) Patent No.: US 12,603,564 B2
(45) Date of Patent: Apr. 14, 2026

(54) POWER CONVERTER AND CONTROLLING METHOD THEREOF

(71) Applicant: Sync Power Corp., Taipei City (TW)

(72) Inventors: Hsian-Pei Yee, Taipei City (TW);
Ya-Wu Chung, Taipei City (TW);
Chun-Jen Huang, Taipei City (TW);
Li-Min Huang, Taipei City (TW); Eric Shuzhen Yee, Taipei City (TW)

(73) Assignee: Sync Power Corp., Taipei City (TW)

( * ) Notice: Subject to any disclaimer, the term of this patent is extended or adjusted under 35 U.S.C. 154(b) by 188 days.

(21) Appl. No.: 18/443,308

(22) Filed: Feb. 16, 2024

(65) Prior Publication Data

US 2025/0266745 A1    Aug. 21, 2025

(51) Int. Cl.
H02M 1/00 (2007.01)
H02M 3/335 (2006.01)
(52) U.S. Cl.
CPC ..... H02M 1/0003 (2021.05); H02M 3/33507 (2013.01)
(58) Field of Classification Search
CPC .............. H02M 1/0003; H02M 1/342; H02M 3/33507; H02M 3/33569
See application file for complete search history.

(56) References Cited

U.S. PATENT DOCUMENTS

| | | | | |
|---|---|---|---|---|
| 11,050,350 B1 * | 6/2021 | Choi | ................. | H02M 3/33576 |
| 11,165,355 B2 * | 11/2021 | Wong | ................ | H02M 3/33569 |
| 11,552,573 B1 * | 1/2023 | Adragna | .......... | H02M 3/33569 |
| 12,136,883 B2 * | 11/2024 | Adragna | .............. | H02M 1/342 |
| 12,289,043 B2 * | 4/2025 | Takehana | .............. | H02M 1/342 |
| 2021/0152094 A1 * | 5/2021 | Wong | ..................... | H02M 1/08 |
| 2021/0194375 A1 * | 6/2021 | Qian | ..................... | H02M 1/08 |
| 2021/0296996 A1 * | 9/2021 | Choi | .................... | H02M 1/083 |
| 2023/0056711 A1 * | 2/2023 | Zhang | ................... | H02M 1/346 |
| 2023/0096383 A1 * | 3/2023 | Adragna | ............ | H02M 1/0035 363/21.13 |

* cited by examiner

*Primary Examiner* — Thienvu V Tran
*Assistant Examiner* — Yahveh Comas Torres
(74) *Attorney, Agent, or Firm* — CKC & Partners Co., LLC

(57) ABSTRACT

A controlling method of a power converter includes performing a first switch controlling step and a second switch controlling step. The first switch controlling step is performed to control a primary switch of the power converter by a first controlling signal. The second switch controlling step is performed to control an active clamp switch of the power converter by a second controlling signal. The primary switch is turned on by the first controlling signal at each of a plurality of power converter switching cycles. The active clamp switch is not turned on by the second controlling signal at a part of the power converter switching cycles, and the active clamp switch is turned on by the second controlling signal at another part of the power converter switching cycles.

18 Claims, 7 Drawing Sheets

POWER CONVERTER AND CONTROLLING METHOD THEREOF

BACKGROUND

Technical Field

The present disclosure relates to a power converter and a controlling method thereof. More particularly, the present disclosure relates to a flyback power converter and a controlling method thereof.

Description of Related Art

The concept to actively clamp, thus reset the power transformer in switch mode power supply has been well known. Snubber clamp refers to the clamping of the surge voltage across the flyback transformer, and the surge voltage is caused by the transformer leakage inductance and sudden turn off of the primary switch. The snubber clamp is a loss circuit, where all of the transformer leakage energy is lost through snubber resistor because of the snubber diode. Active clamp, on the other hand, recovers (at least in part of) the leakage inductance energy by replacing the snubber diode with an active transistor. The transistor serves the diode function with its built in diode, and also is actively switched on to recycle of the snubber capacitor energy back to the transformer and input power source.

Another important aspect of active clamp is its resonate property, which can be used to soft switching the associated power switch. Indeed, currently, most Active Clamp Flyback (ACF) solutions include active clamp and soft switching (Zero Voltage Switching (ZVS)). However, active clamp has its disadvantages, which are little discussed in the past. The chief disadvantage is the power losses associated with the ACF switch.

SUMMARY

According to one aspect of the present disclosure, a controlling method of a power converter includes performing a first switch controlling step and a second switch controlling step. The first switch controlling step is performed to control a primary switch of the power converter by a first controlling signal. The second switch controlling step is performed to control an active clamp switch of the power converter by a second controlling signal. The primary switch is turned on by the first controlling signal at each of a plurality of power converter switching cycles. The active clamp switch is not turned on by the second controlling signal at a part of the power converter switching cycles, and the active clamp switch is turned on by the second controlling signal at another part of the power converter switching cycles.

According to another aspect of the present disclosure, a controlling method of a power converter includes performing a first switch controlling step and a second switch controlling step. The first switch controlling step is performed to control a primary switch of the power converter by a first controlling signal. The second switch controlling step is performed to control an active clamp switch of the power converter by a second controlling signal. A number of first times the primary switch is turned on by the first controlling signal is greater than a number of second times the active clamp switch is turned on by the second controlling signal in each of a plurality of durations, and each of the durations includes a plurality of power converter switching cycles.

According to further another aspect of the present disclosure, a power converter includes a primary switch and an active clamp switch. The primary switch is controlled by a first controlling signal. The active clamp switch is connected to the primary switch and controlled by a second controlling signal. The primary switch is turned on by the first controlling signal at each of a plurality of power converter switching cycles. The active clamp switch is not turned on by the second controlling signal at a part of the power converter switching cycles, and the active clamp switch is turned on by the second controlling signal at another part of the power converter switching cycles.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
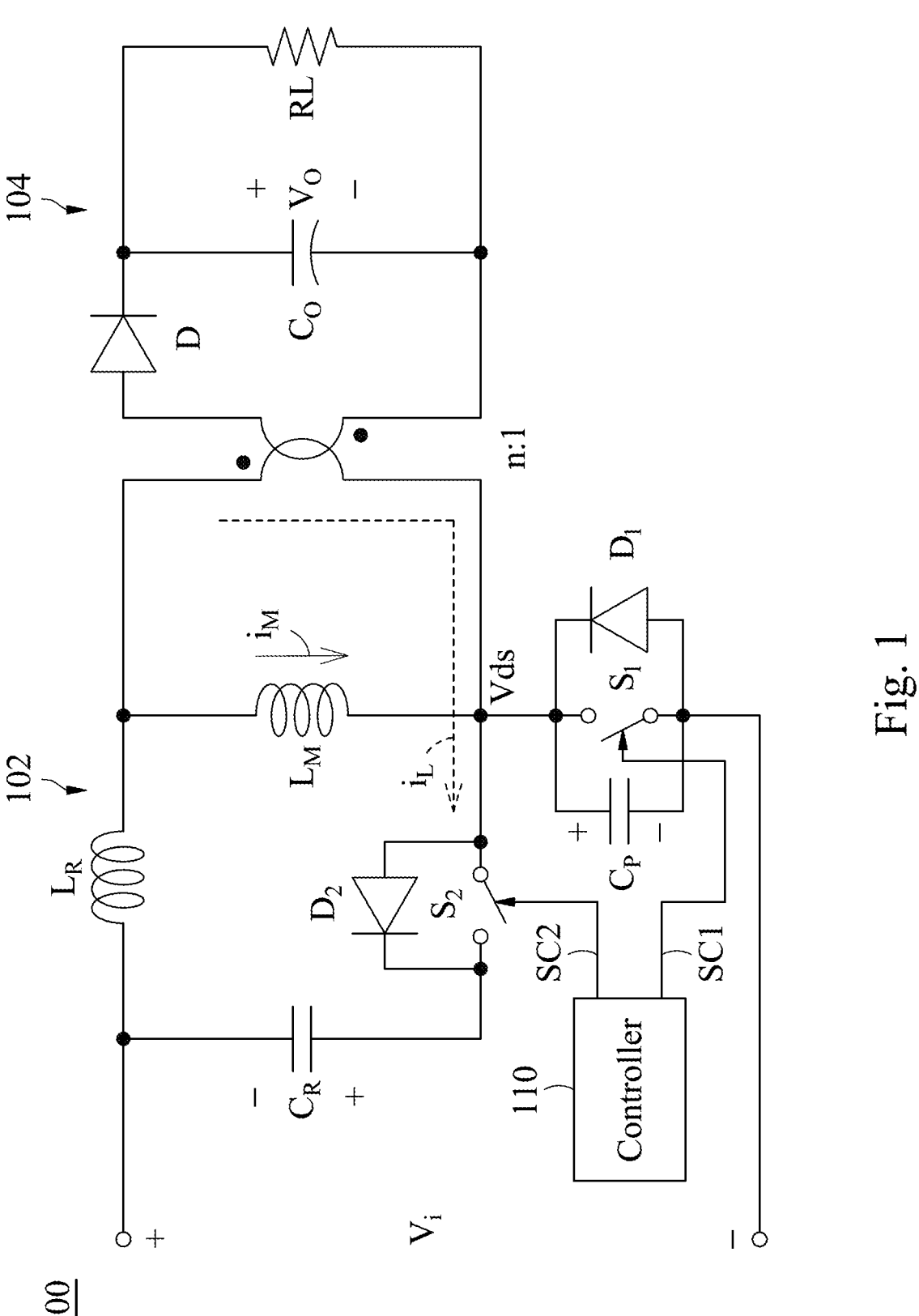
FIG. 1 shows a circuit diagram of a power converter according to a first embodiment of the present disclosure.

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "coupled to" another element, it can be directly coupled to the other element, or it can be indirectly coupled to the other element, that is, intervening elements may be present. In contrast, when an element is referred to as be "directly coupled to" another element, there are no intervening elements present. In addition, the terms first, second, third, etc. are used herein to describe various elements or components, these elements or components should not be limited by these terms. Consequently, a first element or component discussed below could be termed a second element or component.

The Csnubber absorbs leakage inductance energy and clamps the Power switch voltage to below the rated maximum voltage of the power switch. The desired clamping voltage (Csnubber voltage) is approximately at about 90% of the rated maximum power switch voltage. In ACF prior arts, the clamping voltage is not specifically controlled, often the clamping voltage is significantly less than the rated max power switch voltage, due to the resonating current at each ACF cycle. At the next cycle, low clamping voltages re-energize the leakage inductance (Vin-Vclamping), which lower the dv/dt at the power switch, but the resulting relatively larger current pushes through the power switch (ACF) body diode, which has relatively large forward voltage and result in an increased power loss. The increased ACF switch body diode conduction, also caused a relatively increased ACF switch body diode reverse recovery loss. Thus, these losses decrease the overall efficiency contribution by including the ACF circuit. The increased ACF current also reduces the power transformer's flux density and efficiency.

ACF is a resonating circuit, where the Csnubber, parasitic capacitances and the leakage inductance forms a resonating LC circuit. This resonating circuit is formed with the turn on of the ACF Metal Oxide Semiconductor Field Effect Transistor (MOSFET), and stopped with the turn off of the ACF MOSFET. Prior arts uses this resonating voltage to soft turn on of the power switch, thus reducing the power switch's switching loss. This adds on to the QR resonating voltage for soft switching. The Csnubber/ACF increases the QR resonating voltages, thus improving soft switching to ZVS. However, ACF resonate is not cost free. A resonating ACF for ZVS results in a lower Csnubber voltage, which increases the ACF MOSFET body diode switching losses at every resonating ACF/ZVS cycle. In the present disclosure, the concept of "Leap ACF" is proposed to enable the ACF MOSFET to leap the power converter cycles, and does not aim use resonating voltages for ZVS.

Figure 2:
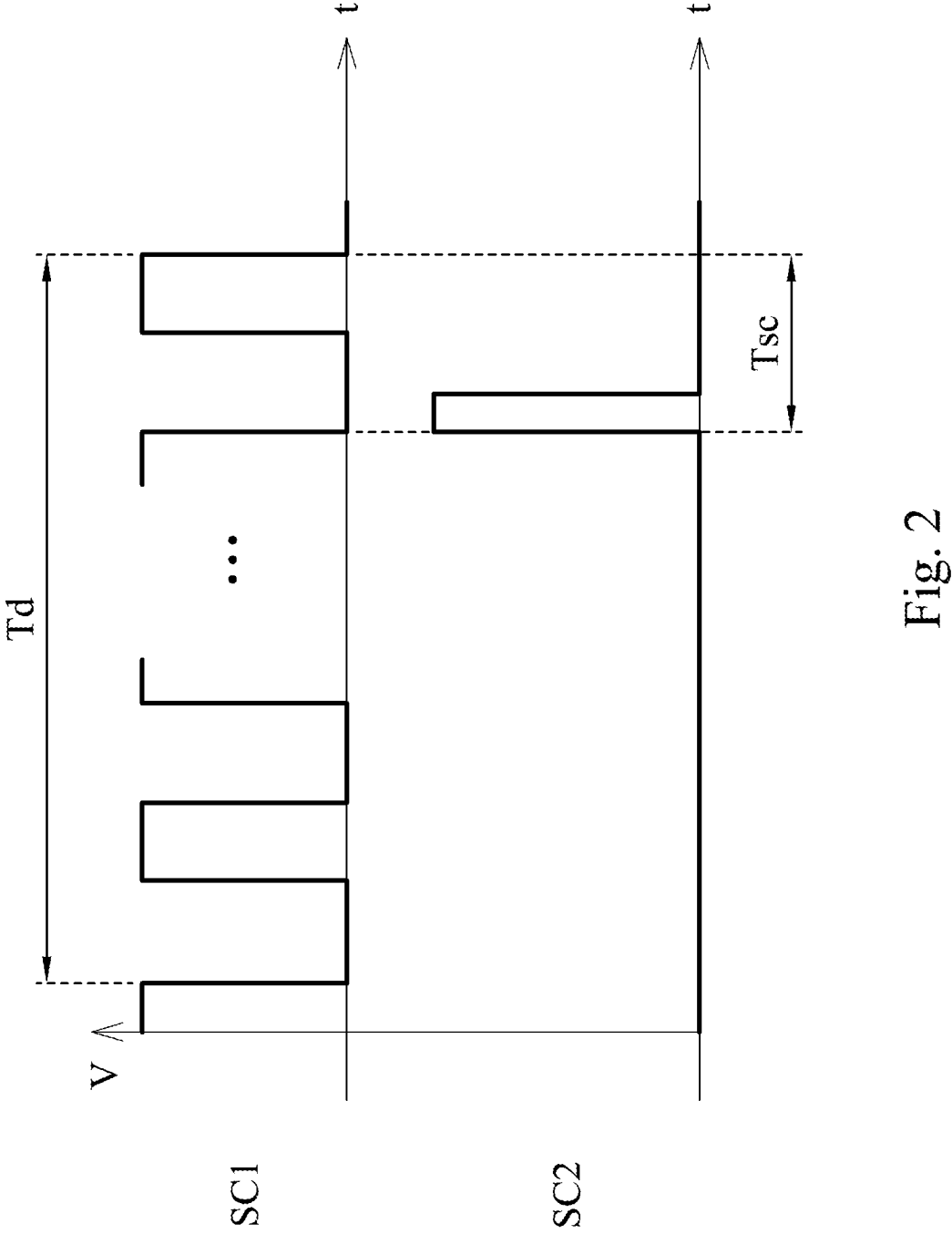
FIG. 2 shows a schematic view of a timing diagram associated with the power converter of FIG. 1.

Reference is made to FIGS. 1 and 2. FIG. 1 shows a circuit diagram of a power converter 100 according to a first embodiment of the present disclosure. FIG. 2 shows a schematic view of a timing diagram associated with the power converter 100 of FIG. 1. The power converter 100 includes a primary side circuit 102, a secondary side circuit 104 and a controller 110.

The primary side circuit 102 includes a primary switch $S_1$, an active clamp switch $S_2$, a primary capacitor $C_R$ (Csnubber), a leakage inductance $L_R$, a magnetizing inductance $L_M$ and a primary main capacitor $C_P$. The primary switch $S_1$ has a body diode $D_1$. The active clamp switch $S_2$ is connected to the primary switch $S_1$ and the primary capacitor $C_R$. The active clamp switch $S_2$ has a body diode $D_2$. Each of the primary switch $S_1$ and the active clamp switch $S_2$ may be an NMOS transistor, but the present disclosure is not limited thereto. The primary capacitor $C_R$ is configured to be charged by a transformer leakage inductance current $i_L$ at each of a plurality of power converter switching cycles Tsc through a body diode $D_2$ of the active clamp switch $S_2$. The transformer's leakage inductance $L_R$ is connected to the primary capacitor $C_R$ and the transformer's magnetizing inductance $L_M$. The magnetizing inductance $L_M$ is connected to the primary switch $S_1$, the active clamp switch $S_2$ and the primary main capacitor $C_P$. A magnetizing current $i_M$ flows through the magnetizing inductance $L_M$.

The secondary side circuit 104 is connected to the primary side circuit 102 via a transformer (n:1). The secondary side circuit 104 includes a secondary side rectifier D and a secondary capacitor $C_O$. The secondary capacitor $C_O$ has an output voltage $V_O$.

The controller 110 is connected to the primary side circuit 102. The controller 110 generates a first controlling signal SC1 and a second controlling signal SC2. The primary switch $S_1$ is controlled by the first controlling signal SC1. The active clamp switch $S_2$ is controlled by the second controlling signal SC2. The primary switch $S_1$ is turned on by the first controlling signal SC1 at each of the power converter switching cycles Tsc. The active clamp switch $S_2$ is not turned on by the second controlling signal SC2 at a part of the power converter switching cycles Tsc, and the active clamp switch $S_2$ is turned on by the second controlling signal SC2 at another part of the power converter switching cycles Tsc.

Therefore, the power converter 100 of the present disclosure utilizes special control techniques of the active clamp switch $S_2$ to keep the primary capacitor $C_R$ (Csnubber) as a clamping device, and keep the clamping voltage at higher value while still offer protection to the power switch from the breakdown voltages. In addition, the present disclosure can recover Csnuuber energy and keep ACF switching loss (ACF MOSFET and body diode) low, thus reducing ACF power loss.

Figure 3:
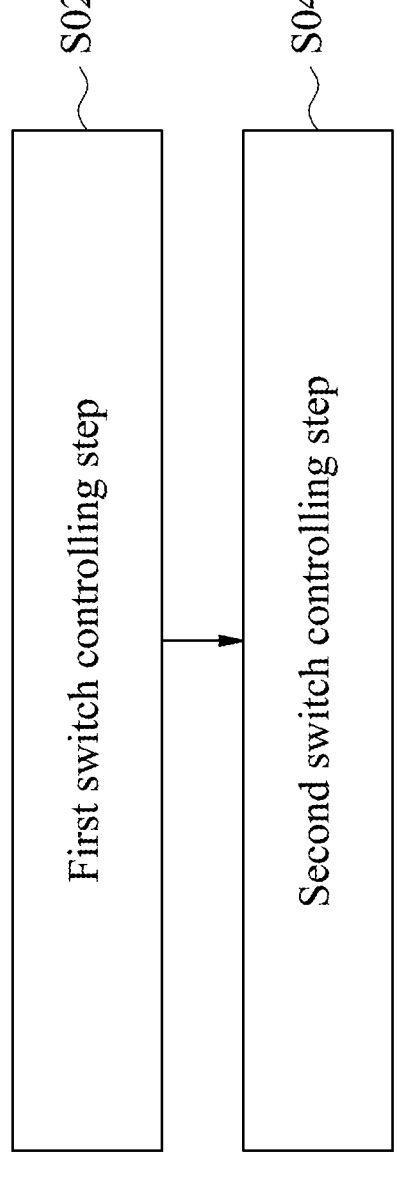
FIG. 3 shows a flow chart of a controlling method of a power converter according to a second embodiment of the present disclosure.

Reference is made to FIGS. 1-3. FIG. 3 shows a flow chart of a controlling method 200 of a power converter 100 according to a second embodiment of the present disclosure. The controlling method 200 of the power converter 100 includes performing a first switch controlling step S02 to control a primary switch $S_1$ of the power converter 100 by a first controlling signal SC1 and performing a second switch controlling step S04 to control an active clamp switch $S_2$ of the power converter 100 by a second controlling signal SC2.

The primary switch $S_1$ is turned on by the first controlling signal SC1 at each of a plurality of power converter switching cycles Tsc. The active clamp switch $S_2$ is not turned on by the second controlling signal SC2 at a part of the power converter switching cycles Tsc, and the active clamp switch $S_2$ is turned on by the second controlling signal SC2 at another part of the power converter switching cycles Tsc. In other words, the number of first times the primary switch $S_1$ is turned on by the first controlling signal SC1 is greater than the number of second times the active clamp switch $S_2$ is turned on by the second controlling signal SC2 in each of a plurality of durations Td. Each of the durations Td includes a plurality of power converter switching cycles Tsc.

Therefore, the controlling method 200 of the power converter 100 of the present disclosure utilizes special control techniques of the active clamp switch $S_2$ to keep the primary capacitor $C_R$ (Csnubber) as a clamping device, and keep the clamping voltage at higher value while still offer protection to the power switch from the breakdown voltages. In addition, the present disclosure can recover Csnuuber energy and keep ACF switching loss (ACF MOSFET and body diode) low, thus reducing ACF power loss.

In detail, the second switch controlling step S04 includes configuring a primary capacitor $C_R$ of the power converter 100 to be charged by a transformer leakage inductance current $i_L$ at each of the power converter switching cycles Tsc through a body diode $D_2$ of the active clamp switch $S_2$.

In the second switch controlling step S04, the active clamp switch $S_2$ is turned on after the part of the power converter switching cycles Tsc, and the part of the power converter switching cycles Tsc includes at least one of the power converter switching cycles Tsc. In other words, the active clamp switch $S_2$ (ACF MOSFET) leaps at least one of the power converter switching cycles Tsc and is not turned on at every power converter switching cycle Tsc. Instead, the active clamp switch $S_2$ leaps at least one of the power converter switching cycles Tsc and is turned on after a group of the power converter switching cycles Tsc, as shown in FIG. 2.

In one embodiment, the number of the at least one of the power converter switching cycles Tsc (a group size) can be determined based on a clamp voltage (Csnubber voltage) of a primary capacitor $C_R$ of the power converter 100, and the clamp voltage is increased at the part of the power converter switching cycles Tsc. In other words, the group size can be selected or sensed based on the clamp voltage. The clamp voltage goes up without turning on the active clamp switch $S_2$ and with every power converter switching cycle Tsc.

In one embodiment, the number of the at least one of the power converter switching cycles Tsc can be determined by sensing a gate voltage of the primary switch $S_1$ of the power converter 100. In other words, the clamp voltage (Csnubber voltage) can be alternatively sensed at the power switch gate (i.e., the gate of the primary switch $S_1$), though a parasitic power switch gate-drain capacitance. The clamp voltage (Csnubber voltage) affects dv/dt at the power switch drain (i.e., the drain of the primary switch $S_1$), which is reflected at the power switch gate, thus the gate voltage of the power switch gate can be used as a proxy as the power switch drain.

In one embodiment, the number of the at least one of the power converter switching cycles Tsc (the group size) can be determined based on an input line voltage $V_i$ of the power converter 100, and the input line voltage $V_i$ of the power converter 100 is negatively correlated with the number of the at least one of the power converter switching cycles Tsc. In other words, the group size can be a function of the input line voltage $V_i$. A smaller group size is corresponding to high input line voltage $V_i$, and a bigger group size is corresponding to low input line voltage $V_i$.

In one embodiment, the number of the at least one of the power converter switching cycles Tsc (the group size) can be determined based on a load RL of the power converter 100, and the load RL of the power converter 100 is negatively correlated with the number of the at least one of the power converter switching cycles Tsc. In other words, the group size can be a function of the load RL. A smaller group size is corresponding to higher load RL, and a bigger group size is corresponding to lower load RL.

In FIG. 1, the desired clamp voltage (Csnubber voltage) of the primary capacitor $C_R$ may be a voltage where the primary switch $S_1$ is protected, while body losses of the active clamp switch $S_2$ are minimized. In FIG. 2, the active clamp switch $S_2$ completes an on operation and an off operation when the primary switch $S_1$ is in an off state.

Figure 4:
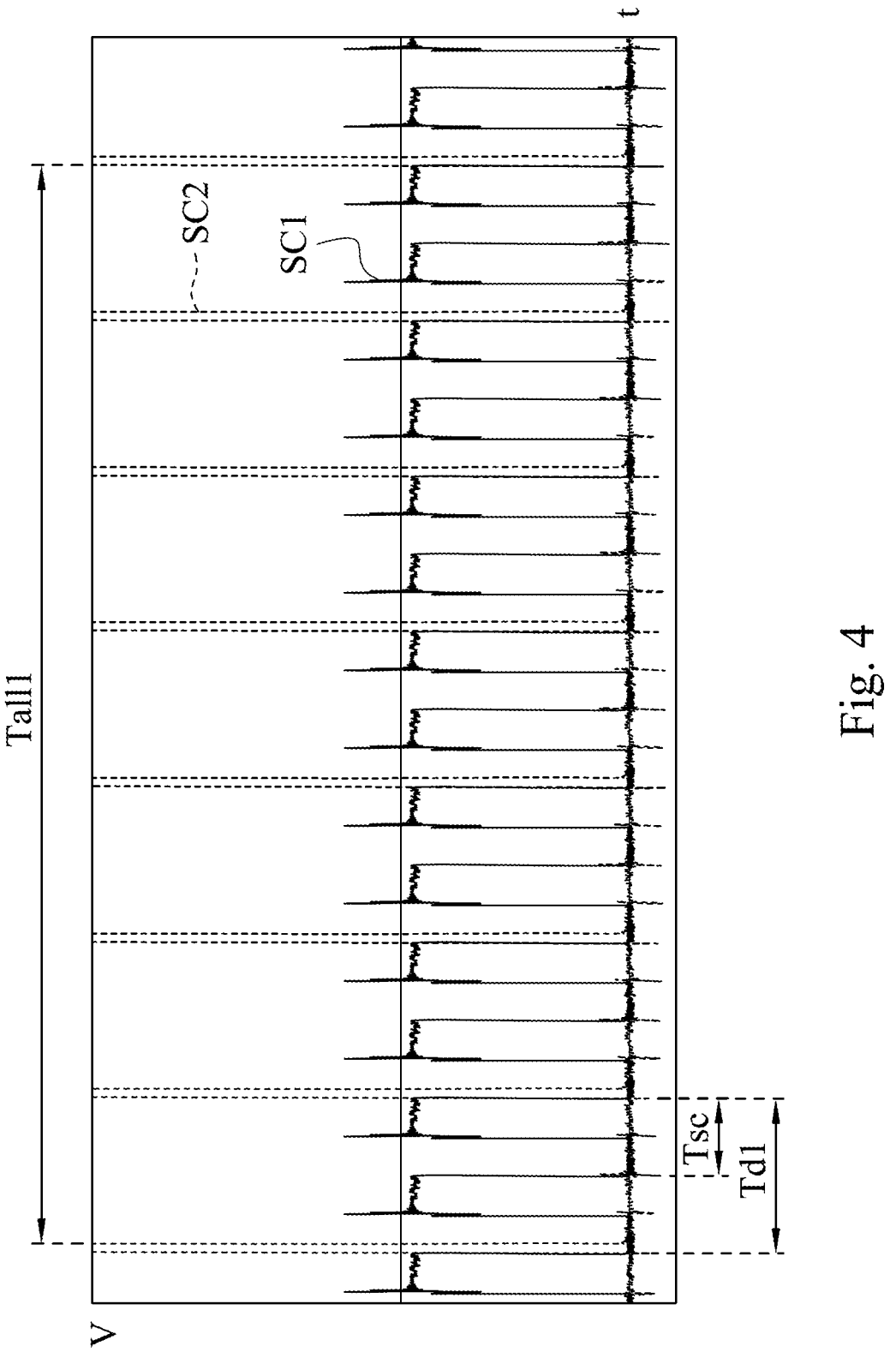
FIG. 4 shows a first timing diagram associated with the power converter of FIG. 1 when an active clamp switch is turned on once in each of a plurality of first durations.
Figure 5:
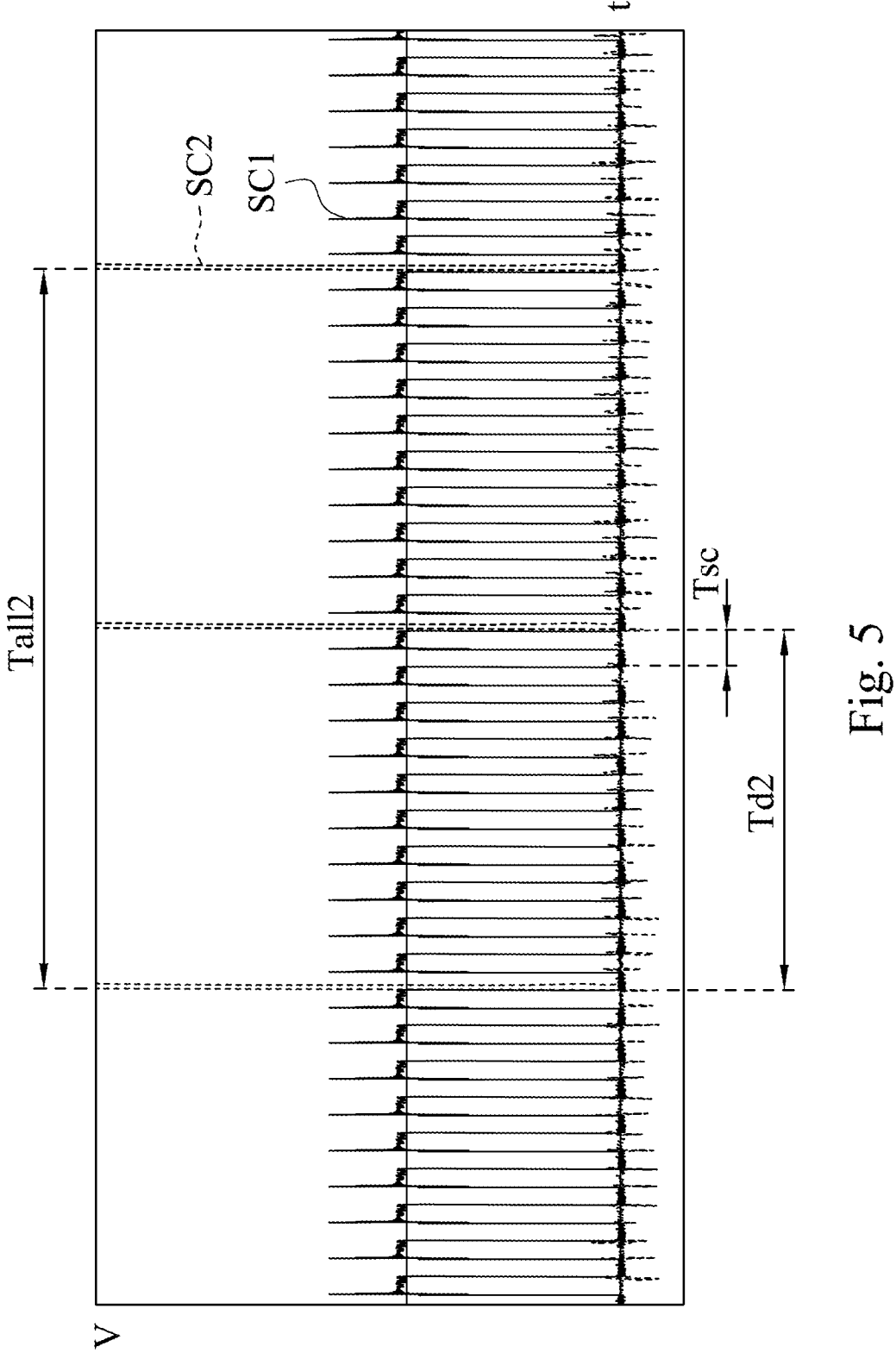
FIG. 5 shows a second timing diagram associated with the power converter of FIG. 1 when the active clamp switch is turned on once in each of a plurality of second durations.

Reference is made to FIGS. 1-5. FIG. 4 shows a first timing diagram associated with the power converter 100 of FIG. 1 when an active clamp switch $S_2$ is turned on once in each of a plurality of first durations Td1. FIG. 5 shows a second timing diagram associated with the power converter 100 of FIG. 1 when the active clamp switch $S_2$ is turned on once in each of a plurality of second durations Td2. In FIG. 4, a first group time period Tall1 includes seven first durations Td1. Each of the first durations Td1 includes two power converter switching cycles Tsc. In FIG. 5, a second group time period Tall2 includes two second durations Td2. Each of the second durations Td2 includes ten power converter switching cycles Tsc. Therefore, the present disclosure utilizes special control techniques of the active clamp switch $S_2$ to keep the primary capacitor $C_R$ (Csnubber) as a clamping device, and keep the clamping voltage at higher value while still offer protection to the power switch from the breakdown voltages. In addition, the present disclosure can recover Csnuuber energy and keep ACF switching loss (ACF MOSFET and body diode) low, thus reducing ACF power loss.

Figure 6:
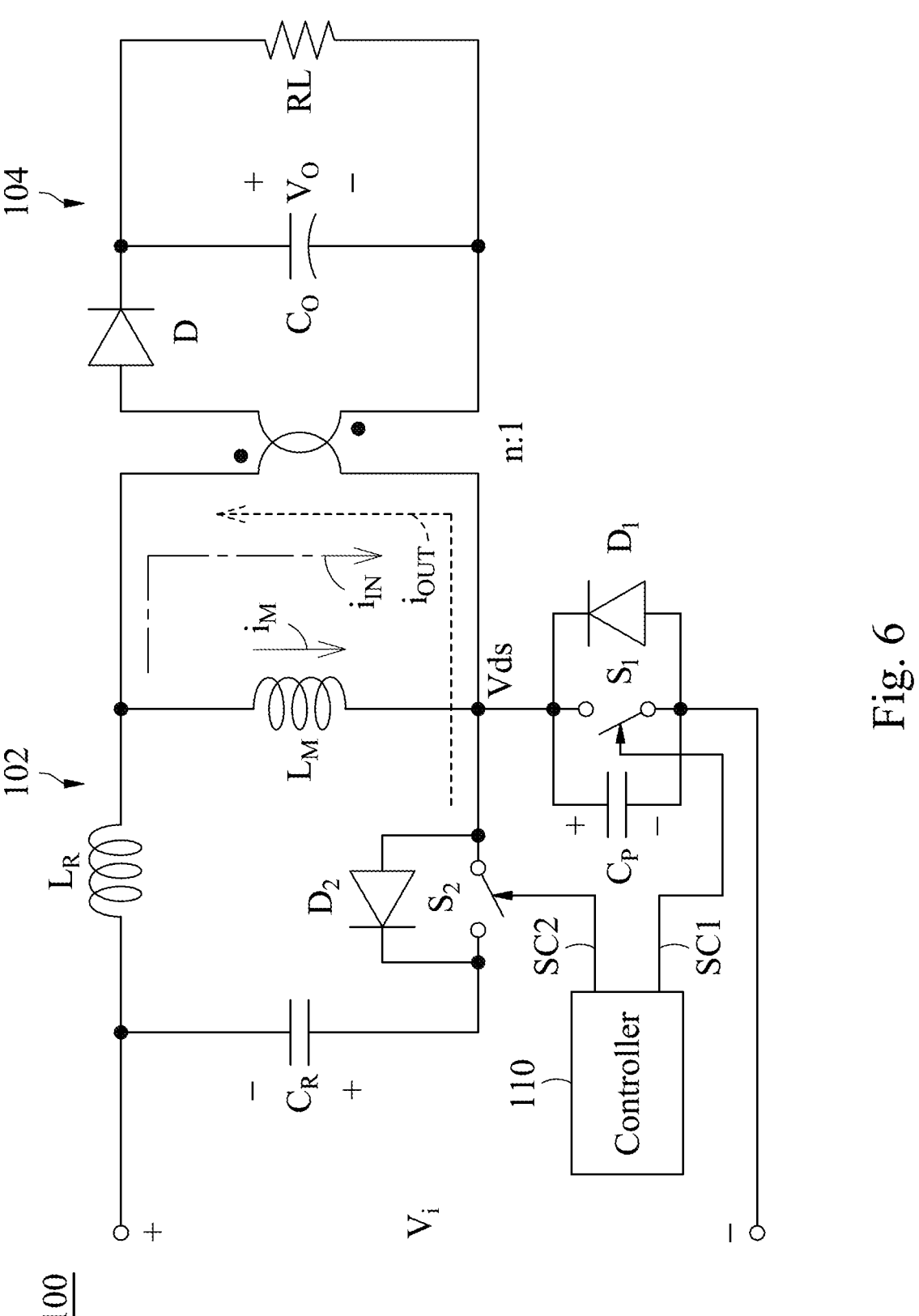
FIG. 6 shows the circuit diagram of the power converter of FIG. 1 when a current flows into or out of a primary capacitor of the power converter through the active clamp switch.
Figure 7:
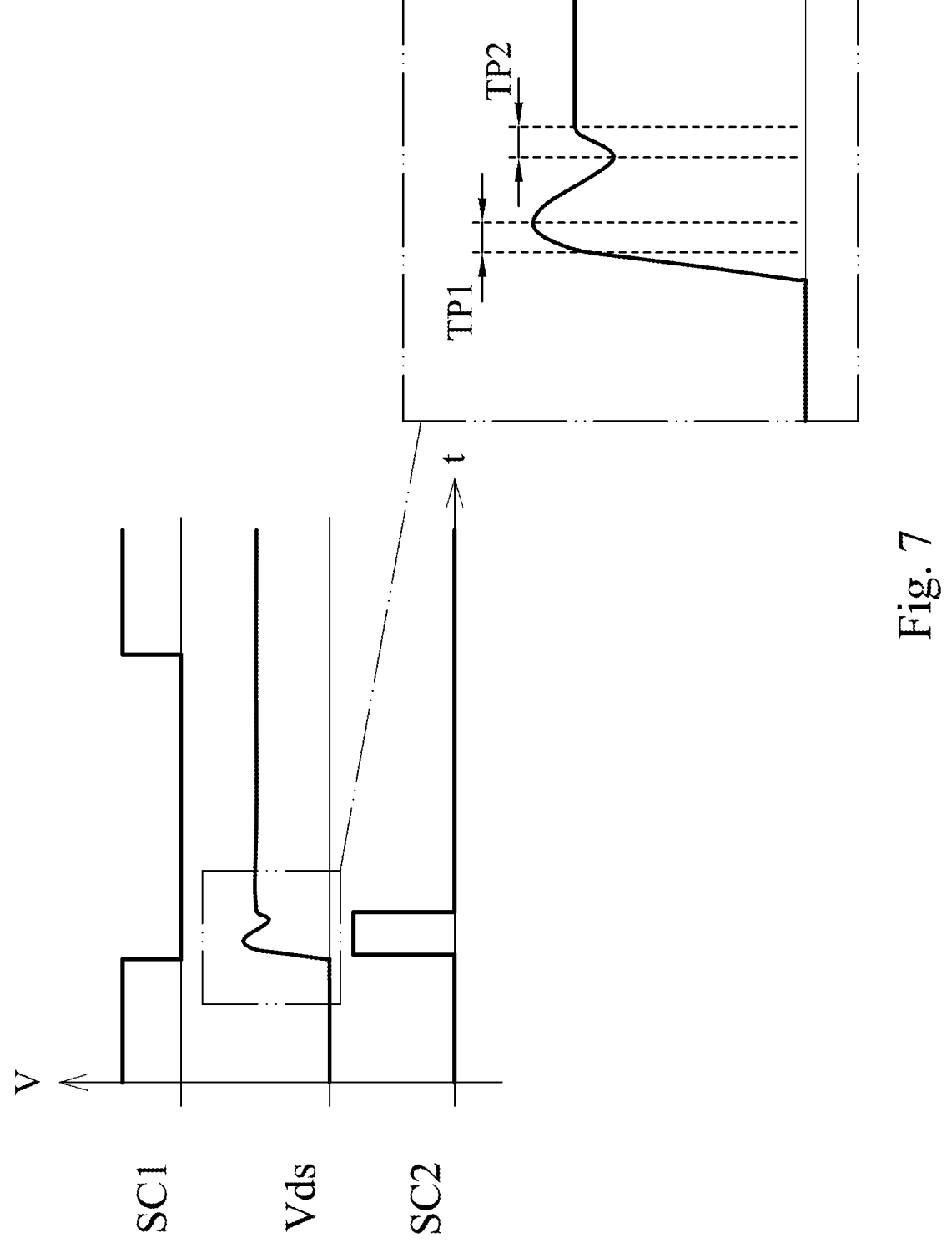
FIG. 7 shows a schematic view of a timing diagram associated with the power converter of FIG. 6.

Reference is made to FIGS. 6 and 7. FIG. 6 shows the circuit diagram of the power converter 100 of FIG. 1 when a current flows into or out of a primary capacitor $C_R$ of the power converter 100 through the active clamp switch $S_2$. FIG. 7 shows a schematic view of a timing diagram associated with the power converter 100 of FIG. 6. The duration of the on state of the active clamp switch $S_2$ can be selected or sensed, so that the active clamp switch $S_2$ can be controlled to be turned off when or close to the transition where the current flows into the primary capacitor $C_R$ (Csnubber) through the active clamp switch $S_2$. After the active clamp switch $S_2$ is turned off, a power switch voltage Vds resonates minimally lower. As lower power switch voltage Vds during the off state of the primary switch $S_1$, it reduces transformer flux density and efficiency.

The duration of the on state of the active clamp switch $S_2$ can be preset timing based, and the fixed duration can be based on each converter, so that the active clamp switch $S_2$ can be turned off in a positive current cycle or in a light negative current cycle. "Positive" is defined as current $i_{IN}$ flow into the primary capacitor $C_R$ (Csnubber). "Negative" is defined as current $i_{OUT}$ flow out of the primary capacitor $C_R$ (Csnubber). Turning off active clamp switch $S_2$ during relative large negative current will result big swings in the power switch voltage Vds, thereby reducing efficiency. In other words, the active clamp switch $S_2$ is turned off in a first time period TP1 or a second time period TP2. The first time period TP1 is different from the second time period TP2, and in the first time period TP1 or the second time period TP2, a transformer leakage inductance current (i.e., the current $i_{IN}$) flows into a primary capacitor $C_R$ of the power converter 100 through the active clamp switch $S_2$.

In one embodiment, the duration of the on state of the active clamp switch $S_2$ can be self-adjusted by following steps. The steps include turning off the primary switch $S_1$ (power switch); turning on the active clamp switch $S_2$; while the active clamp switch $S_2$ is turned on, putting the power switch gate in a high impedance state, but with max voltage clamped at below power switch threshold voltage Vth; sensing the gate voltage of the power switch gate, which is coupled with the power switch voltage Vds (ACF voltage) through a power switch parasitic capacitance; determining an optimal duration of the on state of the active clamp switch $S_2$; putting the power switch gate in a low impedance off state; and turning off the active clamp switch $S_2$.

In one embodiment, the duration of the on state of the active clamp switch $S_2$ can be self-adjusted by following steps. The steps include turning off the primary switch $S_1$ (power switch); turning on the active clamp switch $S_2$; while the active clamp switch $S_2$ is turned on, keeping the power switch gate with the low impedance off state; sensing a gate current of the power switch gate, which is coupled with the power switch voltage Vds (ACF voltage) through the power switch parasitic capacitance; determining an optimal duration of the on state of the active clamp switch $S_2$; and turning off the active clamp switch $S_2$.

According to the aforementioned embodiments and examples, the advantages of the present disclosure are described as follows.

1. The present disclosure can utilize special control techniques of the active clamp switch to keep the primary capacitor (Csnubber) as a clamping device, and keep the clamping voltage at higher value while still offer protection to the power switch from the breakdown voltages.

2. The present disclosure can recover Csnuuber energy and keep ACF switching loss (ACF MOSFET and body diode) low, thus reducing ACF power loss.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A controlling method of a power converter, comprising:
performing a first switch controlling step to control a primary switch of the power converter by a first controlling signal; and
performing a second switch controlling step to control an active clamp switch of the power converter by a second controlling signal;
wherein the primary switch is turned on by the first controlling signal at each of a plurality of power converter switching cycles, the active clamp switch is not turned on by the second controlling signal at a part of the power converter switching cycles, and the active clamp switch is turned on by the second controlling signal at another part of the power converter switching cycles;
wherein in the second switch controlling step, the active clamp switch is turned on after the part of the power converter switching cycles, and the part of the power converter switching cycles comprises at least one of the power converter switching cycles.

2. The controlling method of the power converter of claim 1, wherein the second switch controlling step comprises:
configuring a primary capacitor of the power converter to be charged by a transformer leakage inductance current at each of the power converter switching cycles through a body diode of the active clamp switch.

3. The controlling method of the power converter of claim 1, wherein a number of the at least one of the power converter switching cycles is determined based on a clamp voltage of a primary capacitor of the power converter, and the clamp voltage is increased at the part of the power converter switching cycles.

4. The controlling method of the power converter of claim 1, wherein a number of the at least one of the power converter switching cycles is determined by sensing a gate voltage of the primary switch of the power converter.

5. The controlling method of the power converter of claim 1, wherein a number of the at least one of the power converter switching cycles is determined based on an input line voltage of the power converter, and the input line voltage of the power converter is negatively correlated with the number of the at least one of the power converter switching cycles.

6. The controlling method of the power converter of claim 1, wherein a number of the at least one of the power converter switching cycles is determined based on a load of the power converter, and the load of the power converter is negatively correlated with the number of the at least one of the power converter switching cycles.

7. The controlling method of the power converter of claim 1, wherein the active clamp switch completes an on operation and an off operation when the primary switch is in an off state.

8. The controlling method of the power converter of claim 7, wherein the active clamp switch is turned off in a first time period or a second time period, the first time period is different from the second time period, and in the first time period or the second time period, a transformer leakage inductance current flows into a primary capacitor of the power converter through the active clamp switch.

9. A controlling method of a power converter, comprising:
performing a first switch controlling step to control a primary switch of the power converter by a first controlling signal; and
performing a second switch controlling step to control an active clamp switch of the power converter by a second controlling signal;
wherein a number of first times the primary switch is turned on by the first controlling signal is greater than a number of second times the active clamp switch is turned on by the second controlling signal in each of a plurality of durations, and each of the durations comprises a plurality of power converter switching cycles;
wherein in the second switch controlling step, the active clamp switch is turned on after a part of the power converter switching cycles, and the part of the power converter switching cycles comprises at least one of the power converter switching cycles.

10. The controlling method of the power converter of claim 9, wherein the second switch controlling step comprises:
configuring a primary capacitor of the power converter to be charged by a transformer leakage inductance current at each of the power converter switching cycles through a body diode of the active clamp switch.

11. The controlling method of the power converter of claim 9, wherein a number of the at least one of the power converter switching cycles is determined based on a clamp voltage of a primary capacitor of the power converter, and the clamp voltage is increased at the part of the power converter switching cycles.

12. The controlling method of the power converter of claim 9, wherein a number of the at least one of the power converter switching cycles is determined by sensing a gate voltage of the primary switch of the power converter.

13. The controlling method of the power converter of claim 9, wherein a number of the at least one of the power converter switching cycles is determined based on an input line voltage of the power converter, and the input line voltage of the power converter is negatively correlated with the number of the at least one of the power converter switching cycles.

14. The controlling method of the power converter of claim 9, wherein a number of the at least one of the power converter switching cycles is determined based on a load of the power converter, and the load of the power converter is negatively correlated with the number of the at least one of the power converter switching cycles.

15. The controlling method of the power converter of claim 9, wherein the active clamp switch completes an on operation and an off operation when the primary switch is in an off state.

16. The controlling method of the power converter of claim 15, wherein the active clamp switch is turned off in a first time period or a second time period, the first time period is different from the second time period, and in the first time period or the second time period, a transformer leakage inductance current flows into a primary capacitor of the power converter through the active clamp switch.

17. A power converter, comprising:
a primary switch controlled by a first controlling signal; and
an active clamp switch connected to the primary switch and controlled by a second controlling signal;
wherein the primary switch is turned on by the first controlling signal at each of a plurality of power converter switching cycles, the active clamp switch is not turned on by the second controlling signal at a part of the power converter switching cycles, and the active clamp switch is turned on by the second controlling signal at another part of the power converter switching cycles;
wherein the active clamp switch is turned on after the part of the power converter switching cycles, and the part of the power converter switching cycles comprises at least one of the power converter switching cycles.

18. The power converter of claim 17, further comprising:
a primary capacitor connected to the active clamp switch and configured to be charged by a transformer leakage inductance current at each of the power converter switching cycles through a body diode of the active clamp switch;
wherein a number of first times the primary switch is turned on by the first controlling signal is greater than a number of second times the active clamp switch is turned on by the second controlling signal in each of a plurality of durations, and each of the durations comprises the power converter switching cycles.

\* \* \* \* \*